Patented Oct. 25, 1932

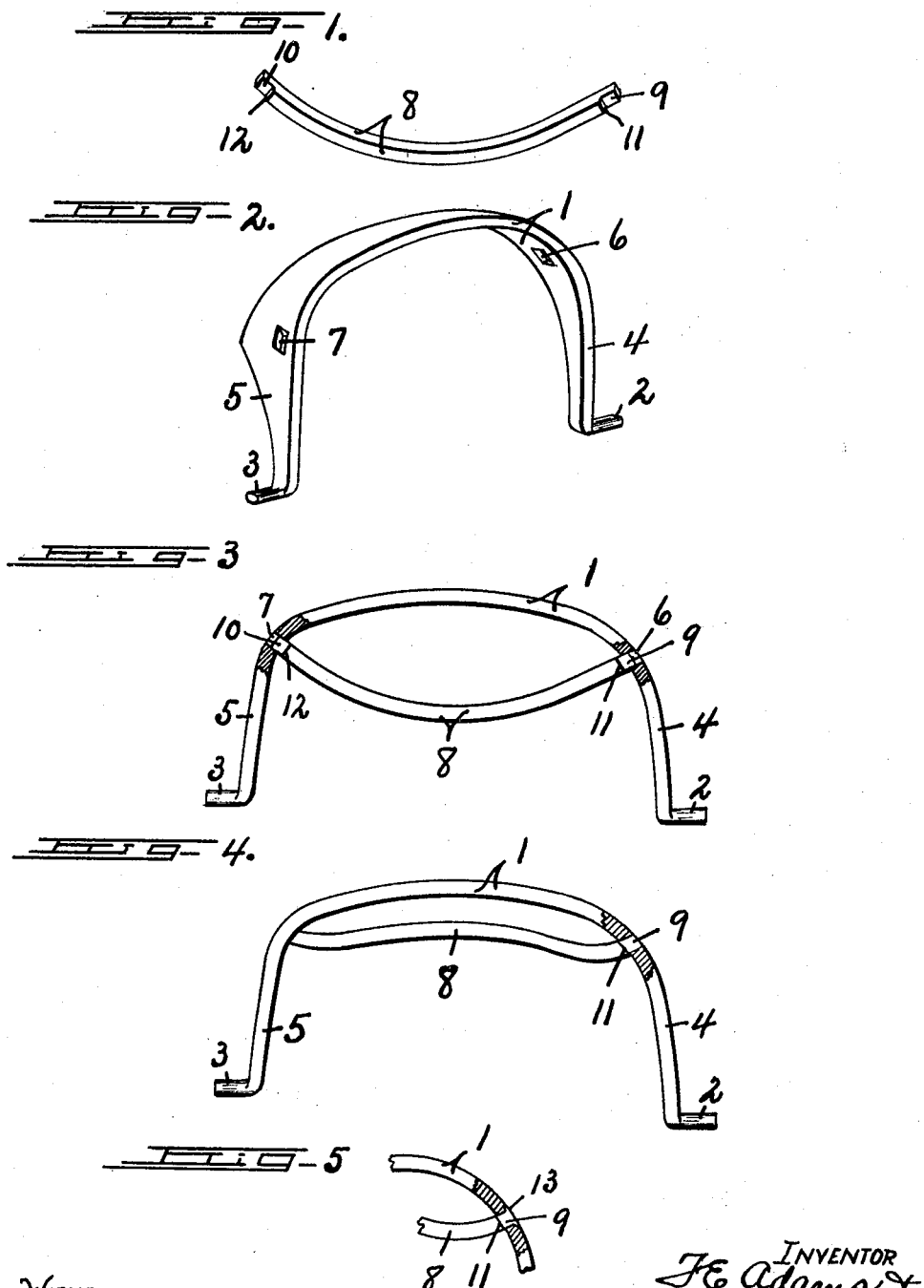

1,884,956

UNITED STATES PATENT OFFICE

FRANCIS E. ADAMS AND CHARLES EARL CHESEBRO, OF ONEIDA, NEW YORK, ASSIGNORS TO TRIUMPH TRAP COMPANY, INC., OF ONEIDA, NEW YORK, A CORPORATION OF NEW YORK

METHOD OF PRODUCING TRAP JAWS

Application filed February 15, 1930. Serial No. 428,778.

This invention relates to certain new and useful improvements in trap jaws and method of producing the same.

The main object of the invention resides in the method of readily, efficiently and economically producing a double trap jaw from two separate pieces of material such as steel, and to the product resulting therefrom.

Other objects and advantages relate to the details of the method and the resultant structure, all as will more fully appear from the following description taken in connection with the accompanying drawing in which:

Figure 1 illustrates the supplemental jaw member as formed prior to its assemblage with the primary jaw.

Figure 2 is a perspective view of the primary jaw.

Figure 3 is a side elevation, partially in section, showing the first step in the assemblage of the primary and supplemental jaws.

Figure 4 is a side elevation, partially in section, illustrating the primary and supplemental jaws, after the latter has been reformed to secure the parts together.

Figure 5 illustrates a slight modification of the invention as applied to a broken away portion of the primary and supplemental jaws.

The method of this invention utilized in the production of a double jaw for animal traps may start with the formation of the usual U-shaped primary jaw 1 having hinging pintles 2 and 3. The opposite legs 4 and 5 of this are formed preferably near their top, with apertures or perforations 6 and 7 respectively, and which apertures may be of desired size and shape and are illustrated as substantially square although any desired shape may be utilized.

A supplemental jaw forming member 8 is provided which may be of any cross sectional form, as square or rectangular, and is bowed or curved as illustrated, so that at this stage of manufacture the distance between its terminal points is somewhat less than the actual length of the strip from which it is formed.

Further, the ends 9 and 10 of this supplemental jaw 8 are reduced in cross sectional area forming shoulders 11 and 12 at the base of the reduced portion. Preferably, the cross sectional shape of the reduced portions 9 and 10 conform substantially to the cross sectional shape of the apertures 6 and 7.

With the primary and supplemental jaws formed as shown in Figures 1 and 2, the length of the supplemental jaw is such in relation to the spaced distance of the legs 4 and 5 so that the reduced ends 9 and 10 of the supplemental jaw 8 may be inserted a short distance in the respective apertures 6 and 7.

With the jaws arranged in this position, pressure is applied to the intermediate portion of the supplemental jaw 8 so as to partially or completely straighten or oppositely deflect the supplemental jaw to lengthen the distance between its terminal portions whereby the shoulders 11 and 12 are pressed into contact with the inner surface of the legs 4 and 5. Reversely it would be possible to apply pressure to the opposite legs 4 and 5 forcing them toward each other to project the reduced portion 9 and 10 into the apertures 6 and 7 respectively.

As illustrated in Figure 4, it may be desirable to reform the supplemental jaw to such an extent that the intermediate portion is bowed slightly upwardly toward the base of the U-shaped primary jaw or extends substantially on a line connecting apertures 6 and 7. Under any of the above conditions the tension of the supplemental jaw, reformed as described, is sufficient to position the reduced end portions 9 and 10 in respective apertures 6 and 7, holding the shoulders 11 and 12 against the inner surface of the primary jaw and, under such condition, the two jaws are rigidly maintained in assembled position, as shown in Figure 4, without the use of other attaching means. However, under certain circumstances, it may be desirable to weld or upset the exposed ends of the reduced portions 9 and 10 against the outer portion of the primary jaw 1, and such a construction is illustrated at 13 in Figure 5 as applied to the connection between the primary and supplemental jaw, at one side of the trap, with the understanding that it is applicable in the same manner to the connection of the primary and supplemental jaw at the opposite side of the strap jaw.

Although we have shown and described a particular structure, form and relation of the parts thereof as illustrative of the method of this invention and a structure produced thereby, we do not desire to restrict ourselves to the details of the method or to the exact resultant form of the structure as various changes and modifications may be made within the scope of the appended claims.

We claim:

1. The method of producing a double jaw for traps comprising forming a substantially U-shaped primary jaw with non-circular apertures in its opposite legs, forming a bowed supplemental jaw with reduced non-circular end portions adapted to respectively fit tightly in said non-circular openings with shoulders at the base of the reduced end portions, assembling the two jaws with the reduced end portions in alignment with respective apertures and the supplemental jaw bowed away from the base of the primary jaw, and then applying pressure to the supplemental jaw to permanently deflect its central portion toward the base of the primary jaw and project the reduced end portions of the supplemental jaw into respective apertures of the primary jaw until the shoulders are in substantial contact with the primary jaw.

2. The method of producing a double jaw for traps comprising forming a substantially U-shaped primary jaw with non-circular apertures in its opposite legs, forming a bowed supplemental jaw with reduced non-circular end portions adapted to respectively fit tightly in said non-circular openings with shoulders at the base of the reduced end portions, assembling the two jaws with the reduced end portions in alignment with respective apertures and the supplemental jaw bowed away from the base of the primary jaw, and then applying pressure to the supplemental jaw to permanently bow its central portion toward the base of the primary jaw leaving the end portions of the supplemental jaw bowed away from the base of the primary jaw and project the reduced end portions of the supplemental jaw into respective apertures of the primary jaw until the shoulders are in substantial contact with the primary jaw.

In witness whereof we have hereunto set our hands this seventh day of February, 1930.

FRANCIS E. ADAMS.
CHARLES EARL CHESEBRO.